Aug. 2, 1955     W. E. GERBING     2,714,313
VARIABLE PITCH PULLEY
Filed March 22, 1951     2 Sheets-Sheet 1
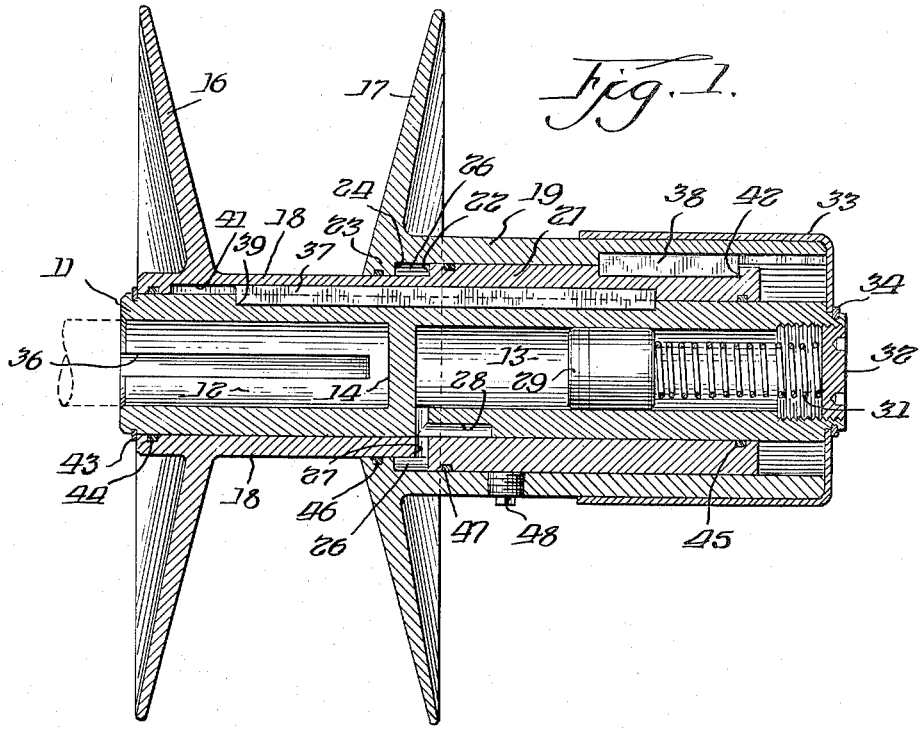
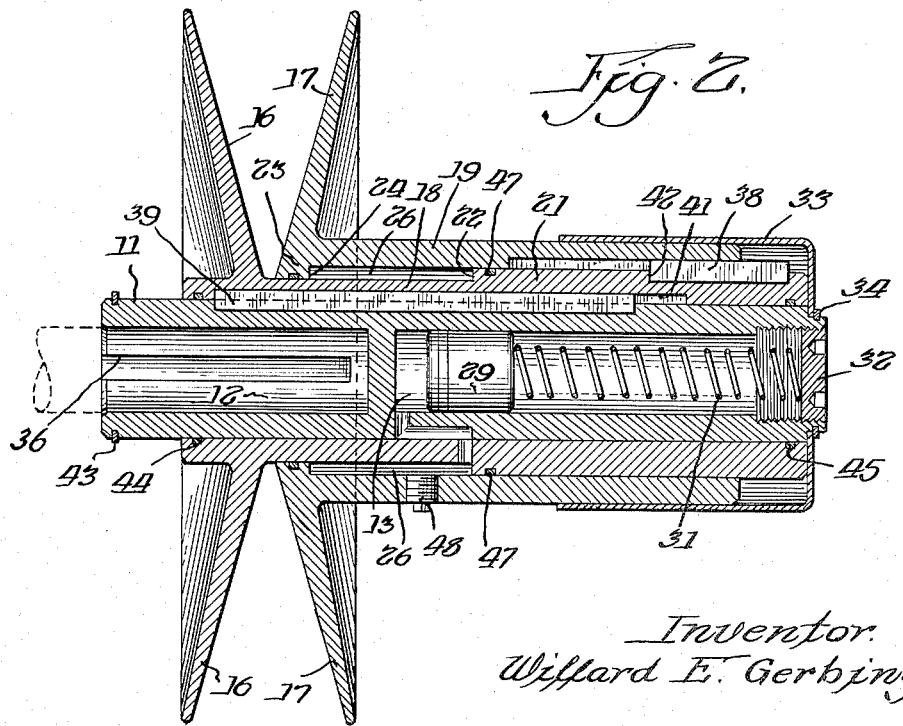
Inventor.
Willard E. Gerbing.

Aug. 2, 1955  W. E. GERBING  2,714,313
VARIABLE PITCH PULLEY
Filed March 22, 1951  2 Sheets-Sheet 2

Inventor.
Willard E. Gerbing
By Hierthes
Attys.

United States Patent Office 2,714,313
Patented Aug. 2, 1955

2,714,313

VARIABLE PITCH PULLEY

Willard E. Gerbing, Park Ridge, Ill.

Application March 22, 1951, Serial No. 216,966

13 Claims. (Cl. 74—230.17)

This invention relates to pulleys in general, and more particularly to variable pitch pulleys.

Known pulleys of the variable pitch type have heretofore been comprised of a pair of movable, opposed pulley halves, and have used mechanical structures, such as a rack and pinion, to transmit a pitch diameter reducing movement of the pulley halves to an energy storage device, such as a coil compression spring, which resists the movement and tends to bring the pulley halves back to their normal position. With pulleys constructed in this manner, it is apparent that the amount of pitch diameter reducing movement that the device is capable of providing is limited mainly by the size of the mechanical motion transmitting structure, for such structures become far too unwieldy upon the pitch diameter reducing movement of the pulley being increased to any considerable extent. Further, known pulleys have no means for automatically taking up misalignment that occurs between the driving and driven pulley during operation, and they are somewhat expensive to maintain in that lubrication of the moving mechanical parts is required. Even with proper maintenance, deterioration of these devices due to normal wear and tear, as well as the noise produced by them when operating, leaves something to be desired.

It is therefore one object of the present invention to provide a variable pitch pulley that is of compact construction, and capable of accomplishing relatively great pitch diameter reducing movements in comparison to its size.

Another object of the invention is to provide a pulley capable of automatically correcting misalignment between its center line and the center line of its counterpart while operating. In its preferred form, this pulley being of the variable pitch type.

Still another object of the invention is to provide a variable pitch pulley that is self-lubricating, and requires little or no maintenance.

A further object of the invention is to provide a variable pitch pulley that has relatively few moving parts, and therefore is less subject to wear and tear than previously known devices of the same nature.

A still further object of the invention is to provide a variable pitch pulley that is substantially noiseless while operating.

A feature of the invention is the provision of a variable pitch pulley which preferably comprises a shaft member, two opposed, movable pulley halves journaled on the shaft member, and hydraulic motion transfer means for moving the pulley halves toward each other upon the same being separated by a pitch diameter reducing movement.

Another feature of the invention is the provision of a pulley device that may include a shaft member, and a pulley journaled on the shaft member, the pulley being positioned longitudinally on the shaft member by a static column of an incompressible fluid whereby the pulley can be automatically moved longitudinally along the shaft to correct for misalignment occurring between its center line and the center line of its counterpart.

A further feature of the invention is the provision of a variable pitch pulley that may include a shaft member, two opposed pulley halves journaled on the shaft member, and hydraulic motion transfer means for moving the pulley halves toward each other upon the same being separated, the hydraulic motion transfer means including a static column of an incompressible fluid whereby the center line of the pulley halves can be automatically shifted longitudinally along the shaft member upon misalignment occurring between the said center line and the center line of its counterpart.

A still further feature of the invention is the provision of a variable pitch pulley including a shaft, a pair of opposed pulley halves journaled on the shaft and movable along its longitudinal axis, and hydraulic motion transfer means for positively moving each of the pulley halves toward each other an equal amount upon the same being separated whereby the center line of the pulley remains fixed.

Many other objects, features, and advantages of the construction herein shown and described will be obvious to those skilled in the art from the disclosure herein given when considered in connection with the drawings, wherein like reference characters indicate like or corresponding parts:

Fig. 1 is a sectional view of one embodiment of a variable pitch pulley constructed in accordance with the invention, and showing the pulley in its minimum pitch diameter position;

Fig. 2 is a sectional view of the variable pitch pulley illustrated in Fig. 1, and showing the pulley in its maximum pitch diameter position;

Figure 3:
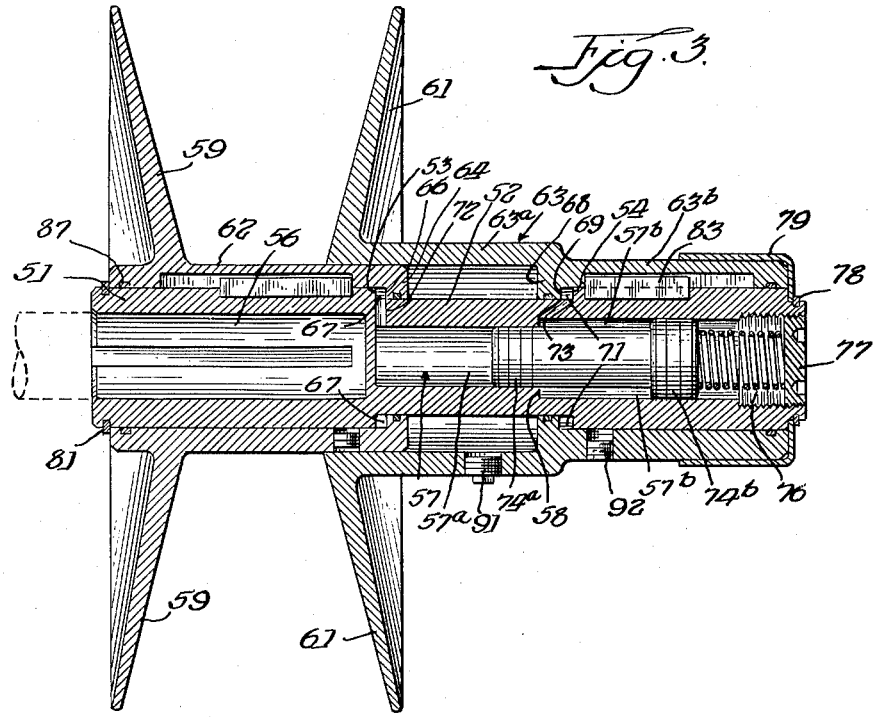
Fig. 3 is a sectional view of a second embodiment of the invention showing the same in its minimum pitch diameter position.

In practicing the invention, a variable pitch pulley is provided which includes a shaft member, a pair of opposed pulley halves having hub portions. The hub portions may be keyed to the shaft in such a manner as to be longitudinally movable with respect to the shaft and with respect to each other, and may be so constructed as to define at least one expansible chamber for receiving an incompressible fluid. Cooperating with the expansible chamber thus defined, is a means for accommodating changes in volume of the expansible chamber, storing the energy required to effect such changes in volume, and utilizing such stored energy to return the expansible chamber to its normal condition. In one embodiment of the invention, the expansible chamber may be defined by a pair of shoulders formed around the inner surface of each of the hubs, and the means for accommodating the changes in volume, storing the energy and returning the expansible chamber to its normal condition may include a cylindrical chamber having a piston slidably seated therein and operatively connected to the expansible chamber through a fluid passageway, and an energy storage device comprising a coil compression spring acting against the piston member to return the expansible chamber to its normal position. In a second embodiment of the invention, the expansible chamber may be defined by a pair of shoulders formed around the outer surface of the shaft by an increased diameter portion thereof, and by a shoulder portion formed on each of the hubs by decreased diameter portions thereof. The shoulders formed on the hubs cooperate with the shoulders formed upon the shaft member to define two separate expansible chambers. The means for accommodating changes in volume, storing the energy, and returning the expansible chamber to its normal condition may include an inner cylindrical chamber divided into two longitudinal sections, a two-part piston member slidably seated in the cylindrical chamber and in cooperation with the two sections thereof defining two separate varying volume chambers. Each of the last-mentioned chambers is connected to a respective one of the expansible chambers through a fluid passageway, and the piston member is acted on by a spring biasing means.

Referring now to Fig. 1 of the drawings, the invention includes a shaft member 11 having a pair of cylindrical chambers 12 and 13 formed therein and separated by a central partition. Journaled on shaft 11 is a pair of pulley halves or discs 16 and 17 having hub portions 18 and 19 which are longitudinally movable with respect to shaft 11 and to each other, and if desired may be telescoped one within the other.

The end of hub 18, opposite pulley half 16, may have an increased diameter portion 21 forming a shoulder 22 about its outer periphery, and the end of hub 19, adjacent pulley half 17, preferably has a decreased diameter portion 23 forming a shoulder 24. Shoulder 24, in conjunction with the inner surface of hub 19, the outer surface of hub 18, and shoulder 22, defines an annular, expansible chamber 26 which is suitably connected through an orifice 27 in hub 18, and an elongated orifice 28 in shaft 11 to one end of the cylindrical chamber 13 in shaft 11. Slidably seated in the remaining end cylindrical chamber 13 and closing the same to form a varying volume chamber is a piston member 29. Piston member 29 is engaged by the end of an energy storage device comprising a coil compression spring 31, backed up by a plug 32 threaded in the end of shaft 11. Plug 32 also serves to retain a cap 33 fitted over the end and outer periphery of hub 19, and held in place by means of an assembly ring 34.

Turning torque is applied to the mechanism by means of a key that is preferably seated in a keyway 36 formed in the inner surface of chamber 12 of shaft 11, such torque being transmitted to each of the hubs 18 and 19 through a key 37 and key 38, respectively. Key 37 is suitably seated in a keyway 39 formed in the outer surface of shaft 11, and has its upper half portion engaging an elongated keyway 41 formed in the inner surface of hub 18, elongated keyway 41 allowing longitudinal movement of hub 18 with respect to shaft 11. Key 38 is likewise seated in a keyway 42 formed in the outer surface of hub 18, and has its upper half portion engaging an elongated keyway formed in the inner surface of hub 19 so as to allow longitudinal movement of hub 19 with respect to hub 18. The longitudinal movement of hub 18 is limited by cap 33 and the longitudinal movement of hub 19 is limited by an assembly ring 43 fitted on the end of shaft 11, and acting in conjunction with cap 33 and assembly ring 34 to retain the pulley in assembled relation. In order to assure that each of the hubs 18 and 19, and shaft 11, move freely with respect to each other, gasket rings 44 and 45 are provided on each end of hub 18, and gaskets 46 and 47 are provided on either side of expansible chamber 26. Gaskets 46 and 47 also serve to sealably close the expansible chamber 26 so as to prevent leakage of the fluid contained therein between hubs 18 and 19.

Before applying torque to the pulley, the varying volume chamber 13 and expansible chamber 26, and their connecting passageways are first filled with an incompressible fluid supplied through either a threaded filling plug 48 when the mechanism is in position shown in Fig. 2, or by removing piston 29 and filling through the open end. After filling the said spaces with the fluid, and assuming that the device is mounted on a driving or driven shaft with a pulley belt fitted over the pulley halves and torque applied thereto, the pulley will assume the position shown in Fig. 2 of the drawings. This is due to the action of coiled compression spring 31, which serves to force liquid out through passageway 28 into expansible chamber 26. Because of the pressure of the liquid acting against shoulders 22 and 24, respectively, hub 18 is moved to the right, and hub 19 is moved to the left, to the positions shown in Fig. 2 of the drawings. In this position the pulley composed of pulley halves 16 and 17 has its greatest pitch diameter. Thereafter, should a pitch diameter reducing movement occur due to increased belt pressure, or the like, hub 18 is moved to the left, and hub 19 is moved to the right from their position shown in Fig. 2, to the position shown in Fig. 1. This action results in increasing the pressure on the incompressible fluid contained in expansible chamber 26, the increase in pressure being transmitted through the fluid in passage 28 to chamber 13, and forcing piston 29 to the right against the action of coil compression spring 31 to tension the same. Simultaneously with this action, the pulley halves 16 and 17 are, of course, spread apart to their position shown in Fig. 1, resulting in a decrease of the pulley pitch diameter. As long as the pitch diameter reducing force is maintained, the pulley remains in a position shown in Fig. 1; however, upon the pitch diameter reducing force being removed, coil spring 31 forces piston 29 to the left, causing the liquid contained in chamber 13 to be transferred through passageway 28 to expansible chamber 26, and again moving the pulley halves 16 and 17 from their separated position to their normal position shown in Fig. 2. From the above description, it is thought to be apparent that the invention provides a novel hydraulic means for moving the pulley halves of a variable pitch pulley toward each other, after the same have been separated by a pitch diameter reducing movement. By designing the mechanism in such a manner that only a slight movement of the piston 29 is required for a relatively large pitch diameter reducing movement of the pulley halves, it can be appreciated that the pulley can be constructed in a very compact form and yet provide a comparatively great pitch diameter reducing movement. This is a particular advantage over prior art variable pitch pulleys in that such devices become far too bulky and unwieldy when designed to provide large pitch diameter reducing movements. In addition to this advantage, it can be seen that should center line misalignment occur between the variable pitch pulley of the invention, and its driving or driven counterpart, the pulley mechanism proper composed of the pulley halves 16 and 17 and their respective hubs 18 and 19, can be automatically shifted to the right or to the left along the longitudinal axis of shaft member 11. This is due to the fact that the hubs 18 and 19 are more or less floatingly supported on the shaft member 11 by the static fluid column contained within the expansible chamber 26 after it has assumed a particular position. As longitudinal shifting of each of the hubs along shaft member 11 does not affect the volume of expansible chamber 26 in any manner, the pulley mechanism can automatically position itself on shaft member 11 within the limits provided by assembly rings 11 and 34 to correct for center line misalignments. This feature, in addition to the above, and the added advantages of self-lubrication, substantially noiseless operation, and fewer mechanical moving parts, provides a novel variable pitch pulley device that is substantially better than any known device of the same nature.

Figure 4:
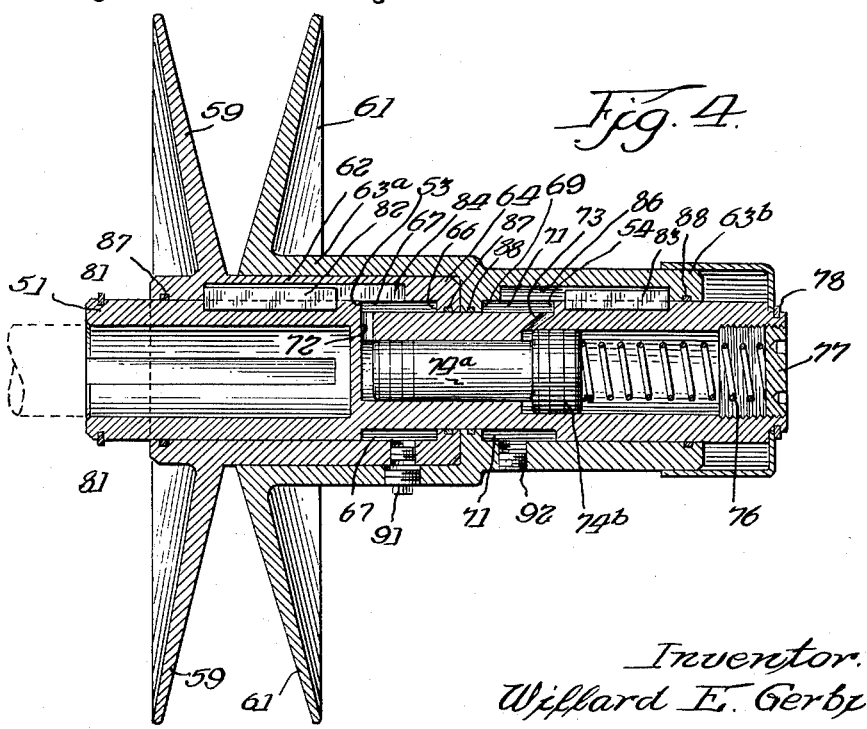
Fig. 4 is a sectional view of the embodiment of the invention shown in Fig. 3, illustrating the same in its maximum pitch diameter position.

With reference now to Figs. 3 and 4, a variable pitch pulley is shown which includes a rotatable shaft member 51 preferably having a decreased outer diameter portion 52 forming a pair of shoulders 53 and 54 about its outer periphery, and a pair of cylindrical chambers 56 and 57 formed therein and separated by a central partition. The chamber 57 is suitably designed so as to comprise two sections—an inner, smaller diameter section 57a, and an outer, larger diameter section 57b, the juncture of the two sections forming an inner shoulder 58 within shaft 51. Journaled on shaft 51 is a pair of pulley halves 59 and 61 having hub portions 62 and 63 which are longitudinally movable with respect to shaft member 51, and with respect to each other, and if desired, hub 62 may be telescoped within hub 63 for a portion of its length.

The end of hub 62 opposite pulley half 59 may have an inwardly turned, integral flange portion 64 forming a shoulder 66 which, together with the shoulder 53 on shaft 51, defines a first, annular, expansible chamber 67. The end of hub 63 opposite pulley half 61 is preferably divided into a larger diameter portion 63a, and smaller diameter portion 63b, with the larger diameter portion 63a being telescoped over hub 62. At the juncture of the sections 63a and 63b there is an inwardly projecting, integral flange 68 forming a shoulder 69 that together in conjunction with the shoulder 54 on shaft 11, defines a second, annular, expansible chamber 71. Expansible chamber 67 is connected through a fluid passageway comprising an aperture 72 in shaft member 51 to the smaller diameter section 57a of chamber 57, and first expansible chamber 71 is connected through a fluid passageway comprising an aperture 73 in shaft 51 to the larger diameter section 57b of chamber 57. Slidably seated in the chamber 57 is a piston member 74 that may be composed of a smaller diameter portion 74a and a larger diameter portion 74b, the smaller diameter portion 74a cooperating with chamber section 57a to form a first varying volume chamber, and the larger diameter portion 74b cooperating with larger diameter chamber section 57b and shoulder 58 to define a second varying volume, annular chamber. The outermost end of piston member 74 is engaged by an energy storage device comprising a coil compression spring 76 that is backed up by a plug 77 threaded in the end of shaft 51, and that normally positions the piston member 74 in the manner shown in Fig. 4 of the drawings. Plug 77, together with an assembly ring 78, serves to retain a cap member 79 over the end of shaft 51 and hub 63 when the two are assembled together, and in conjunction with a second assembly ring 81 on the opposite end of shaft 51, serves to retain the entire mechanism in assembled relation.

In order to transmit a torque applied to shaft 51, or to pulley halves 59 and 61, whichever the case may be, a pair of keys 82 and 83 is provided. Key 82 is suitably seated in a keyway formed in one end of shaft 11 and in an elongated keyway 84 formed in the outer surface of hub 62, and key 83 is likewise seated in a keyway formed in the remaining end of shaft 51, and in an elongated keyway 86 in the lesser diameter portion 63b of hub 63. By this construction, elongated keyways 84 and 86 allow freedom for movement so that the hubs 62 and 63 are locked to shaft 51 for torque, but are movable relative thereto along the longitudinal axis. In order that the hubs be freely movable with respect to the shaft and at the same time maintain a fluid tight closure within each of the expansible chambers 67 and 71, a gasket 87 is seated in each end of hub 62 and a gasket 88 is seated in the end of hub 63b remote from pulley half 61, and in the portion of flange 68 engaging shaft 51.

Before placing the embodiment of the invention shown in Figs. 3 and 4 in operation, the pulley halves 59 and 61 are pushed together in the manner shown in Fig. 4, and an incompressible fluid is inserted in each of the expansible chambers 67 and 71 through a pair of removable filling plugs 91 and 92, respectively. The pulley mechanism is then attached to a shaft which can be used to drive the mechanism, or which can be driven by the mechanism. Upon torque being applied to the pulley, the pulley halves assume the position shown in Fig. 4 of the drawing. Upon a pitch diameter reducing force being applied to either of the pulley halves due to increased belt pressure, or the like, they are pushed apart to the position shown in Fig. 3.

This action results in contracting the expansible chambers 67 and 71 from their condition shown in Fig. 4 to that shown in Fig. 3 of the drawings, and results in forcing the incompressible fluid down into the varying volume chambers 57a and 57b. Piston member 74 is then forced against the action of coil compression spring 76 and compresses the same. As long as the pitch diameter reducing force remains static, the pulley halves remain in the position shown in Fig. 3 of the drawings. Upon the pitch diameter reducing force being relieved, however, coil compression spring 76 forces piston member 74 inwardly, moving the entrapped liquid in the varying volume chambers 57a and 57b out through apertures 72 and 73, respectively, and into expansible chambers 67 and 71. Movement of the incompressible fluid into expansible chambers 67 and 71 causes the two chambers to again assume their expanded condition shown in Fig. 4, and results in drawing the pulley halves 59 and 61 together to their normal, maximum pitch diameter position.

From the above description of the embodiment of the invention shown in Figs. 3 and 4, it can be appreciated that upon a pitch diameter reducing movement being imparted to the pulley halves 59 or 61, the movement is transmitted through the incompressible fluid to piston member 74. Movement of the piston member 74 causes the volume of each of the varying volume chambers 57a and 57b to increase an equal amount, decreasing the volume of expansible chambers 67 and 71 an equal amount, and causing each of the pulley halves to move outwardly an equal amount. This action also occurs during a pitch diameter increasing movement; therefore, the operation of the pulley is such that the center line of the pulley is maintained in the same position during and after pitch diameter reducing movements. The advantage obtained from maintaining the pulley center line in a set position is that belt misalignment between the pulley and its counterpart is absolutely prevented. In passing, it might be well to note that as a matter of design the elongated keyways 84 and 86 are each cut a little deeper than necessary so as to provide passageways above the respective keys 82 and 83 for any liquid which could possibly be entrapped in the keyways.

From the foregoing description, it can be appreciated that the invention provides a variable pitch pulley of compact construction, and capable of relatively large pitch diameter reducing movements in comparison to its size. In one embodiment of the invention, the feature of automatic alignment of the pulley center line with the center line of its counterpart should misalignment occur is provided. In a second embodiment of the invention, equal movement of each of the pulley halves comprising the pulley is assured so that a constant center line position is maintained. In addition to these advantages, the pulley is self-lubricating, and has fewer moving mechanical parts, so that maintenance and deterioration, due to wear and tear, are reduced to a minimum and is substantially noiseless when in operation. It makes available a novel and highly useful mechanism heretofore unknown in the art.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. A variable pitch pulley including in combination a shaft member, a pair of opposed pulley halves having hub portions connected to said shaft, said hubs being longitudinally movable with respect to said shaft and to each other, and having portions defining at least one expansible chamber for receiving an incompressible fluid, and means cooperating with said expansible chamber for accommodating the changes in volume of said expansible chamber, storing the energy required to effect such changes in volume of the expansible chamber, and utilizing such stored energy to return said expansible chamber to its quiescent condition, said means including at least one variable volume chamber operatively connected to said expansible chamber through a fluid passageway, and an energy storage device operable by the variations in volume of said varying volume chamber.

2. A variable pitch pulley including in combination a shaft member, a pair of opposed pulley halves having hub portions connected to said shaft, said hubs being longitudinally movable with respect to said shaft and to each other, and each having integral shoulder portions cooperating with each other to define an expansible chamber for receiving an incompressible fluid, and means cooperating with said expansible chamber for absorbing the changes in volume thereof, storing the energy required to effect such changes in volume, and thereafter utilizing such stored energy to return said expansible chambers to their quiescent condition, said last mentioned means including a static column of an incompressible fluid for floatingly supporting said pulley halves on said shaft in a set condition with respect to each other but allowing relative movement of said pulley halves with respect to said shaft.

3. A variable pitch pulley including in combination a shaft member having shoulders formed around the outer surface thereof, a pair of opposed pulley halves having hub portions connected to said shaft, said hubs being longitudinally movable with respect to said shaft and to each other, and each having integral shoulder portions cooperating with the shoulders on said shaft members to define a pair of expansible chambers for receiving an incompressible fluid, and means cooperating with said expansible chambers for absorbing the changes in volume thereof, storing the energy required to effect such changes in volume, and thereafter utilizing such stored energy to return said expansible chambers to their quiescent condition.

4. A variable pitch pulley including in combination a shaft member, a pair of opposed pulley halves having hub portions connected to said shaft, said hubs being telescoped one within the other and longitudinally movable with respect to said shaft and to each other, the inner one of said telescoped hubs having an increased outer diameter portion forming a shoulder, and the outer one of said telescoped hubs having a decreased inner diameter portion forming a shoulder, each of said shoulders cooperating to define an expansible chamber for receiving an incompressible fluid, and means cooperating with said expansible chamber for accommodating the changes in volume of said expansible chamber, storing the energy required to effect such changes in volume of the expansible chamber, and utilizing such stored energy to return said expansible chamber to its quiescent condition, said means including at least one variable volume chamber operatively connected to said expansible chamber through a fluid passageway, and an energy storage device operable by the variations in volume of said varying volume chamber.

5. A variable pitch pulley including in combination a shaft member having a decreased diameter portion forming a pair of opposed shoulders, a pair of opposed pulley halves having hub portions keyed to said shaft, said hubs being telescoped one within the other and longitudinally movable with respect to said shaft and to each other, the inner one of said hubs having a decreased inner diameter end portion forming a flange which in cooperation with one of the shoulders on said shaft defines a first expansible chamber for receiving an incompressible fluid, and the outer one of said hubs having a decreased inner diameter portion forming a flange which in cooperation with the remaining shoulder on said shaft defines a second expansible chamber for receiving an incompressible fluid, and means cooperating with each of said expansible chambers for accommodating the changes in volume of said expansible chamber, storing the energy required to effect such changes in volume of the expansible chamber, and utilizing such stored energy to return said expansible chamber to its quiescent condition, said means including at least one variable volume chamber operatively connected to said expansible chamber through a fluid passageway, and an energy storage device operable by the variations in volume of said varying volume chamber.

6. A variable pitch pulley including in combination a shaft member having a chamber formed therein for receiving an incompressible fluid, a pair of opposed pulley halves having hub portions connected to said shaft for rotational movement therewith, said hubs being telescoped one within the other and being longitudinally movable with respect to said shaft and with respect to each other, said hubs having portions defining at least one expansible chamber, said last mentioned chamber being connected to said first mentioned chamber through a fluid passageway, and a piston member slidably seated in said first mentioned chamber and operable therein to reduce or expand the volume thereof.

7. A variable pitch pulley including in combination a shaft member having a chamber formed therein for receiving an incompressible fluid, a pair of opposed pulley halves having hub portions telescopically movable one within the other, the innermost hub being keyed to said shaft and longitudinally movable with respect thereto, said telescoping hubs having integral shoulder portions cooperating with each other to define an expansible chamber, said last mentioned chamber being connected to said first mentioned chamber through a fluid passageway, and a spring biased piston member slidably seated in said first mentioned chamber and operable therein to reduce or expand the volume thereof simultaneously with an increase or decrease of the volume of said last mentioned expansible chamber.

8. A variable pitch pulley including in combination a shaft member having a chamber formed therein for receiving an incompressible fluid, and a pair of shoulders formed about the outer surfaces thereof, a pair of opposed pulley halves having hub portions telescopically movable one within the other, the innermost hub being keyed to said shaft and longitudinally movable with respect thereto, and the outermost hub being keyed to the innermost hub and longitudinally movable with respect thereto, said telescoping hubs having integral shoulder portions cooperating with the shoulders on said shaft to define a pair of expansible chambers, said last mentioned chamber being connected to said first mentioned chamber through a fluid passageway, and a spring biased piston member slidably seated in said first mentioned chamber and operable therein to reduce or expand the volume thereof simultaneously with an increase or decrease of the volume of said last mentioned expansible chamber.

9. A variable pitch pulley including in combination a shaft member having a chamber formed therein for receiving an incompressible fluid, a pair of opposed pulley halves having hub portions connected to said shaft for rotational movement therewith, said hubs being telescoped one within the other and being longitudinally movable with respect to said shaft and with respect to each other, the inner one of said telescoped hubs having an increased outer diameter portion forming a shoulder, and the outer one of said telescoped hubs having a decreased inner diameter portion forming a shoulder, each of said shoulders cooperating to define an expansible chamber for receiving an incompressible fluid, said shaft having an elongated aperture therein forming a fluid passageway between said last mentioned expansible chamber and said first mentioned chamber, a piston member slidably seated in said first mentioned chamber and operative to increase or decrease the volume thereof, and biasing means supported by said shaft and engaging said piston to resist movements thereof tending to increase the volume of said first mentioned chamber.

10. The combination set forth in claim 7 further characterized by means for filling said expansible chamber with an incompressible fluid, gaskets seated in said hubs on both sides of said expansible chamber for sealably closing the said expansible chamber, and a cap member fitted over the end of said telescoping hubs and secured to the end of said shaft member.

11. A variable pitch pulley including in combination a shaft member having a decreased outside diameter portion forming a pair of opposed outer shoulders and an inner chamber formed therein for receiving an incompressible fluid, said inner cylindrical chamber being divided into two longitudinal sections having different diameters and forming an inner shoulder at their junctures, a pair of opposed pulley halves having hub portions keyed to said shaft, said hubs being telescoped one within the other and longitudinally movable with respect to said shaft and to each other, the inner one of said hubs being shorter than the outer hub and having a decreased diameter end portion forming a flange which in cooperation with one of the outer shoulders on said shaft defines a first expansible chamber for receiving an incompressible fluid, and the outer one of said hubs including a portion extending beyond the inner hub and having a decreased inner diameter forming a flange which in cooperation with the remaining outer shoulder on said shaft defines a second expansible chamber for receiving an incompressible fluid, said shaft having a first aperture therein forming a fluid passageway interconnecting said first expansible chamber and the lesser diameter section of the chamber in said shaft, said shaft also having a second aperture therein forming a fluid passageway interconnecting said second expansible chamber and the greater diameter section of the chamber in said shaft, a two-part piston member having a first portion slidably seated in the lesser diameter section of the chamber in said shaft and a second portion slidably seated in the greater diameter portion of said shaft chamber, said piston portions being operative to increase or decrease the volumes of their respective chamber sections, and biasing means supported by said shaft and engaging said piston member to resist movements of said member tending to increase the volume of said first and second chamber sections.

12. The combination set forth in claim 9 further characterized by means for filling said expansible chambers with an incompressible fluid, gaskets seated in said hubs on both sides of said expansible chambers for sealably closing the said expansible chamber, and a cap member fitted over the end of said telescoping hubs and secured to the end of said shaft member.

13. In a variable pitch pulley comprising pulley halves and including in combination an incompressible fluid motion transfer system comprising an expansible chamber operatively formed by the pulley halves and an energy storage device formed by spring means, means for varying the pitch diameter of the variable pitch pulley comprising means including a varying volume chamber operatively connected to the expansible chamber and piston means operatively mounted therein for transmitting the pitch diameter reducing movement of the pulley through said incompressible fluid motion transfer system upon said piston means operatively connected to said energy storage device to increase the potential energy content thereof, and said storage device thereafter acting in conjunction with said piston means upon said incompressible fluid to offset the results of the pitch diameter reducing movement.

References Cited in the file of this patent

UNITED STATES PATENTS

| 2,034,666 | Reeves | Mar. 17, 1936 |
| 2,198,940 | Heyer | Apr. 30, 1940 |
| 2,313,436 | Hennessy | Mar. 9, 1943 |
| 2,346,868 | Perry | Apr. 18, 1944 |
| 2,463,031 | Hallinan | Mar. 1, 1949 |
| 2,521,457 | Heyer | Sept. 5, 1950 |

FOREIGN PATENTS

| 12,201 | Great Britain | A. D. 1910 |